G. O. CURME, Jr.
PROCESS FOR PREPARING ACETONE FROM ACETIC ACID.
APPLICATION FILED JUNE 16, 1916. RENEWED DEC. 12, 1917.
1,315,544.
Patented Sept. 9, 1919.
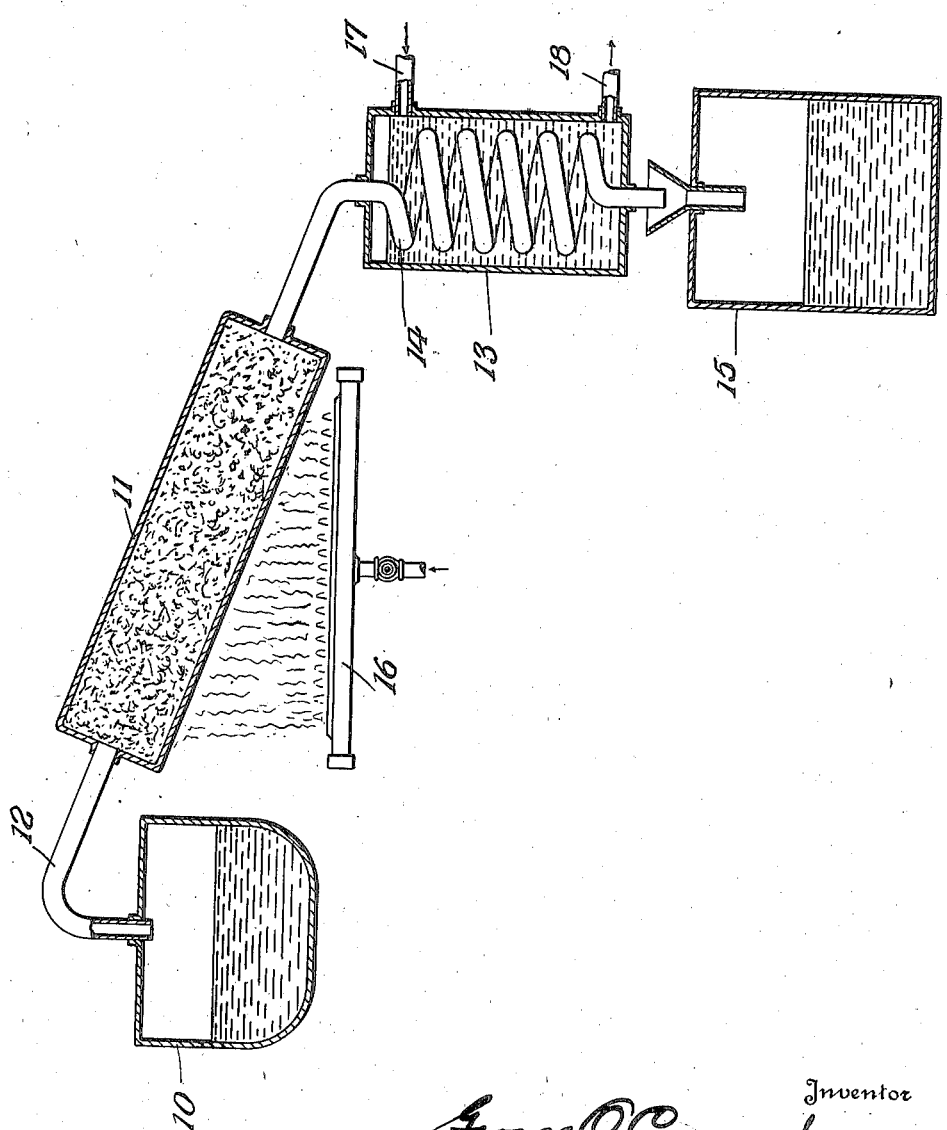

UNITED STATES PATENT OFFICE.

GEORGE O. CURME, JR., OF PITTSBURGH, PENNSYLVANIA, ASSIGNOR, BY MESNE ASSIGNMENTS, TO UNION CARBIDE COMPANY, OF NEW YORK, N. Y., A CORPORATION OF VIRGINIA.

PROCESS FOR PREPARING ACETONE FROM ACETIC ACID.

1,315,544.      Specification of Letters Patent.      Patented Sept. 9, 1919.

Application filed June 16, 1916, Serial No. 104,077. Renewed December 12, 1917. Serial No. 206,850.

*To all whom it may concern:*

Be it known that I, GEORGE O. CURME, Jr., a citizen of the United States, residing at Pittsburgh, Allegheny county, and State of Pennsylvania, have invented and discovered certain new and useful Improvements in Processes for Preparing Acetone from Acetic Acid, of which the following is a specification.

It has been known and recognized since the very early days of chemical science that acetone can be produced by the thermal decomposition of acetates, especially the acetates of the alkaline earth metals, or, indeed, by the thermal decomposition of acetic acid itself, alone or in the presence of certain substances exerting catalytic effect on the vapors of the acetic acid. The temperature to be used, the vessels required, the method of heating, catalytic substances in whose presence the reaction runs more smoothly, and many other points influencing the above described reactions, have themselves formed the basis for the granting of patents in this and other countries.

Liebig originally made the observation that acetic acid, when conducted through an iron tube heated red hot, is decomposed, yielding acetone along with other products. As is obvious from this author's publication, the temperature was not accurately measured nor regulated; also, the yield was far from that demanded by the theory in a reaction running smoothly to give all the acetone possible according to the reaction

Squibb found that acetic acid is decomposed in the presence of certain alkaline earth oxids, carbonates or acetates to give good but not perfect yields of acetone, and subsequently Sabatier, Maihle and others have specified a variety of oxids, metals, and compounds of metals, the presence of which, facilitates the smooth decomposition of free acetic acid, in the absence or presence of water vapor, into acetone.

I have discovered that metallic iron can be used in a certain way to exert a most favorable effect on the above reaction. Best results can be attained when it is divided into the form of long, fine shavings and placed in a tube or vessel uniformly heated to 550°–600° C., into which the vapors of acetic acid, pure or mixed with the vapors of other liquids, such as acetone, water, etc., are passed regularly. The iron maintains its metallic state but at the same time brings about the decomposition of the acetic acid into acetone, carbon dioxid and water, with practically no formation of methane, hydrogen or other less valuable substances. The special features of the iron in this case are; first, that being a good conductor of heat it maintains a uniform temperature throughout the tube, a most essential feature of a complete and uniform reaction; second, it does not exert a destructive contact effect on the acetone once formed, but permits it to pass on through the tube unchanged to the receivers; third, it does exert a contact effect on the acetic acid vapor, permitting the decomposition—which tends to take place anyway—of the acetic acid at a lower temperature than though it were not present; fourth, the combination of effects just mentioned is such that the transformation of the acetic acid to acetone carbon dioxid and water, as above described, is a quantitative one, thus being more economical than the process now in use for the preparation of acetone where, at most, 80–90% efficiency is obtained. Also, the mechanical properties of the iron permit ready handling, and it can be used indefinitely to change limitless quantities of acetic acid to acetone.

The purpose of my present invention is, therefore, to provide a process by which acetone may be prepared from acetic acid in the vapor form by passing the same through tubes or vessels containing iron in a finely divided condition, as of fine shavings, maintaining these tubes or vessels at a temperature between 550° C. and 600° C., at which temperature a quantitative yield of acetone is obtained from the acetic acid introduced, condensing the vapors issuing from this apparatus and then preparing from the condensate, by simple rectification, the pure acetone.

In carrying out my invention, I use an apparatus of a general character illustrated in the accompanying drawing, wherein 10 represents a still for the acetic acid; 11 a chamber filled with iron shavings and connected with the still 10 by a pipe 12; 13 a condenser in which a condensing coil 14 connected with the chamber 11 is mounted, and 15 the acetone container. A heater such as a gas burner 16, or other appropriate heating device is mounted under the chamber 11. The condenser has a cooling medium inlet 17 and outlet 18.

In operation the acetic acid vapor passes through pipe 12, into the heated chamber 11, which is filled with comminuted iron and heated, and the heat maintained at a temperature approximately as above stated, which permits decomposition. The vapors pass from chamber 11 out through the condensing coil 14 where they are condensed and are discharged into the container 15. Pure acetone is prepared from this condensate by simple rectification.

Having thus fully described my said invention, what I claim as new and desire to secure by Letters Patent, is:

1. The process of preparing acetone from acetic acid in the form of vapor which consists in passing said vapor through vessels containing iron in finely comminuted condition and heated to a temperature approximately between 550° C. and 600° C.

2. The process of preparing acetone from acetic acid which consists in mixing acetic acid vapor with the vapors of other liquids and passing the mixture over heated iron in a finely comminuted condition, substantially as set forth.

3. The process of preparing acetone which consists in mixing acetic acid vapor with water vapor and passing the mixture through a re-action chamber in contact with heated iron in finely comminuted condition, substantially as set forth.

In witness whereof, I have hereunto set my hand and seal at Washington, District of Columbia, this twenty-ninth day of May, A. D. nineteen hundred and sixteen.

GEORGE O. CURME, JR. [L. S.]

Witnesses:
E. W. BRADFORD,
CHAS. E. RIORDAN.